United States Patent
Barnes et al.

(10) Patent No.: US 9,441,428 B1
(45) Date of Patent: *Sep. 13, 2016

(54) MASTER CONTROL SYSTEM WITH REMOTE MONITORING FOR HANDLING TUBULARS

(71) Applicant: Loadmaster Universal Rigs, Inc., Houston, TX (US)

(72) Inventors: R. Michael Barnes, Magnolia, TX (US); James A. Zapico, Houston, TX (US)

(73) Assignees: Canyon Oak Energy LLC, Houston, TX (US); Loadmaster Universal Rigs, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/574,248

(22) Filed: Dec. 17, 2014

Related U.S. Application Data

(63) Continuation of application No. 13/679,960, filed on Nov. 16, 2012, now Pat. No. 8,949,416.

(60) Provisional application No. 61/587,438, filed on Jan. 17, 2012.

(51) Int. Cl.
| | | |
|---|---|---|
| *G06F 15/173* | (2006.01) | |
| *E21B 19/15* | (2006.01) | |
| *E21B 44/00* | (2006.01) | |
| *G05B 15/02* | (2006.01) | |

(52) U.S. Cl.
CPC .............. *E21B 19/155* (2013.01); *E21B 44/00* (2013.01); *G05B 15/02* (2013.01)

(58) Field of Classification Search
CPC ........ E21B 44/00; E21B 19/155; E21B 7/02; E21B 19/15; G05B 15/02; G06F 15/17306; H04L 47/10; H04L 47/11; H04L 47/12; H04L 47/15; H04L 47/30; H04L 47/70; F16L 1/06
USPC ..................................... 700/83.275
See application file for complete search history.

(56) References Cited

U.S. PATENT DOCUMENTS

| | | | | |
|---|---|---|---|---|
| 4,794,534 | A * | 12/1988 | Millheim ................ | E21B 44/00 175/40 |
| 5,107,705 | A * | 4/1992 | Wraight .................. | E21B 19/20 348/85 |
| 6,896,055 | B2 * | 5/2005 | Koithan ................ | E21B 19/166 166/250.15 |
| 7,142,986 | B2 * | 11/2006 | Moran .................... | E21B 44/00 702/9 |
| 7,571,817 | B2 * | 8/2009 | Scott .................. | B01D 33/0376 209/404 |
| 7,819,207 | B2 * | 10/2010 | Cowan ...................... | E21B 7/02 175/52 |
| 7,938,197 | B2 * | 5/2011 | Boone ...................... | E21B 7/06 175/27 |

(Continued)

*Primary Examiner* — Charles Kasenge
(74) *Attorney, Agent, or Firm* — Lowenstein Sandler LLP; Cicero H. Brabham, Jr.

(57) ABSTRACT

A master control system with remote monitoring that can perform, monitor, and control operations of a portable rig with a pipe handler as the pipe handler installs tubulars into a drill string or breaks out tubulars from a drill string for a wellbore. The master control system can include a processing device communicatively coupled to a data storage. The processing device receives a communication associated with a component of a portable rig. The processing device determines a position of the component of the portable rig based on the received communication. The processing device further provides an executive dashboard that includes at least one drilling rig function associated with the component of the portable rig. The processing device also initiates the portable rig to perform the at least one drilling rig function associated with the component of the portable rig.

15 Claims, 6 Drawing Sheets

(56) References Cited

U.S. PATENT DOCUMENTS

| | | | | |
|---|---|---|---|---|
| 7,945,488 B2* | 5/2011 | Karr | E21B 47/00 | 705/28 |
| 8,016,033 B2* | 9/2011 | Iblings | E21B 19/16 | 166/192 |
| 8,121,971 B2* | 2/2012 | Edwards | E21B 44/00 | 706/48 |
| 8,312,995 B2* | 11/2012 | Dufilho | B01D 33/0315 | 209/309 |
| 8,326,538 B2* | 12/2012 | Hobbs | E21B 47/12 | 175/40 |
| 8,672,055 B2* | 3/2014 | Boone | E21B 7/04 | 175/26 |
| 8,720,545 B2* | 5/2014 | Iblings | E21B 19/16 | 166/192 |
| 8,949,416 B1* | 2/2015 | Barnes | G06F 15/17306 | 370/229 |
| 8,973,656 B2* | 3/2015 | McClung, III | B82Y 15/00 | 166/250.12 |
| 2005/0216197 A1* | 9/2005 | Zamora | G01V 1/34 | 702/6 |
| 2005/0222772 A1* | 10/2005 | Koederitz | E21B 21/08 | 702/6 |
| 2006/0173625 A1* | 8/2006 | Moran | E21B 44/00 | 702/9 |
| 2007/0061081 A1* | 3/2007 | Moran | E21B 44/00 | 702/9 |
| 2007/0284147 A1* | 12/2007 | Moran | E21B 44/00 | 175/24 |
| 2008/0156531 A1* | 7/2008 | Boone | E21B 7/06 | 175/27 |
| 2008/0208475 A1* | 8/2008 | Karr | E21B 47/00 | 702/6 |
| 2008/0294606 A1* | 11/2008 | Moran | G06F 17/2229 | |
| 2009/0025930 A1* | 1/2009 | Iblings | E21B 19/16 | 166/244.1 |
| 2009/0071720 A1* | 3/2009 | Cowan | E21B 7/02 | 175/57 |
| 2009/0090555 A1* | 4/2009 | Boone | E21B 44/02 | 175/45 |
| 2009/0132458 A1* | 5/2009 | Edwards | G06N 5/025 | 706/50 |
| 2010/0256914 A1* | 10/2010 | Hutin | E21B 41/00 | 702/9 |
| 2011/0162891 A1* | 7/2011 | Camp | E21B 7/067 | 175/61 |
| 2011/0297395 A1* | 12/2011 | Codesal | E21B 47/00 | 166/378 |
| 2012/0056751 A1* | 3/2012 | Field | E21B 44/00 | 340/854.6 |
| 2012/0061087 A1* | 3/2012 | Iblings | E21B 19/16 | 166/316 |
| 2012/0132418 A1* | 5/2012 | McClung, III | B82Y 15/00 | 166/250.12 |
| 2012/0152530 A1* | 6/2012 | Wiedecke | E21B 19/07 | 166/250.01 |

\* cited by examiner

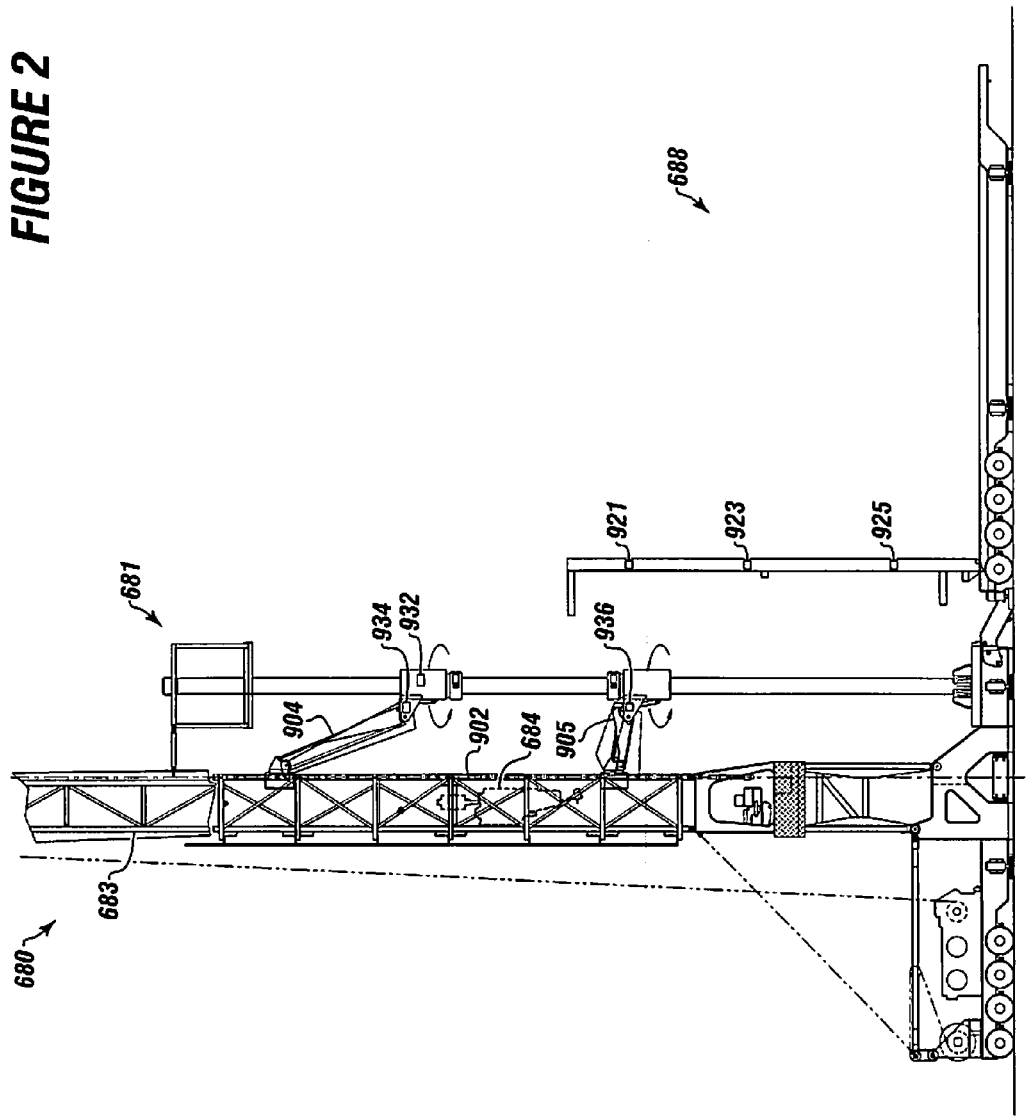

FIGURE 3A

| | |
|---|---|
| DATA STORAGE | 610a |
| COMPUTER INSTRUCTIONS TO MANAGE SYNCHRONIZED FUNCTIONS OF THE DRILLING RIG, A VERTICAL PIPE HANDLER, AND A HORIZONTAL TO VERTICAL PIPE HANDLER | 620 |
| COMPUTER INSTRUCTIONS TO DETERMINE WHEN A TUBULAR IS ON A HORIZONTAL TO VERTICAL PIPE HANDLER | 621 |
| COMPUTER INSTRUCTIONS TO RAISE THE TUBULAR FROM A HORIZONTAL POSITION TO A VERTICAL POSITION USING THE HORIZONTAL TO VERTICAL PIPE HANDLER | 624 |
| COMPUTER INSTRUCTIONS TO EXTEND TOP AND BOTTOM PIVOTING ARMS OF THE VERTICAL PIPE HANDLER | 626 |
| COMPUTER INSTRUCTIONS TO GRAB THE RAISED TUBULAR FROM THE HORIZONTAL TO VERTICAL PIPE HANDLER USING THE TOP AND BOTTOM PIVOTING ARMS | 627 |
| COMPUTER INSTRUCTIONS TO ROTATE THE EXTENDED PIVOTING ARMS HOLDING THE TUBULAR TO POSITION THE TUBULAR OVER THE WELL CENTER | 628 |
| COMPUTER INSTRUCTIONS TO LIFT THE TUBULAR TO A POSITION PROXIMATE TO THE TOP DRIVE FOR CONNECTION WITH THE TOP DRIVE | 629 |
| COMPUTER INSTRUCTIONS TO LOWER THE TOP DRIVE DOWN A MAST OF THE DRILLING RIG FOR CONNECTION TO AN END OF THE TUBULAR | 630 |
| COMPUTER INSTRUCTIONS TO CONNECT THE TOP DRIVE TO THE TUBULAR | 631 |
| COMPUTER INSTRUCTIONS TO ROTATE THE TUBULAR USING THE TOP DRIVE TO INSERT THE TUBULAR INTO THE WELLBORE WHILE LOWERING THE TOP DRIVE TOWARDS THE WELL BORE | 632 |
| COMPUTER INSTRUCTIONS TO DISENGAGE THE TUBULAR FROM THE TOP DRIVE ONCE THE TUBULAR REACHES A PRESET DEPTH | 634 |
| COMPUTER INSTRUCTIONS TO RETRACT THE TOP DRIVE AWAY FROM THE WELLBORE | 646 |
| COMPUTER INSTRUCTIONS TO FORM AN EXECUTIVE DASHBOARD OF RIG FUNCTIONS, VERTICAL PIPE HANDLER FUNCTIONS AND HORIZONTAL TO VERTICAL PIPE HANDLER FUNCTIONS | 661 |
| COMPUTER INSTRUCTIONS FOR SIMULTANEOUSLY DRILLING WITH THE DRILLING RIG WHILE CONNECTING TUBULARS | 638 |
| COMPUTER INSTRUCTIONS FOR MEASURING THE LENGTH OF EACH TUBULAR THAT ENTERS THE WELLBORE | 1000 |
| COMPUTER INSTRUCTIONS FOR COUNTING EACH TUBULAR WITH THE RIG MOUNTED SENSOR AS THE TOP DRIVE INSERTS THE TUBULARS INTO THE WELLBORE | 1002 |
| COMPUTER INSTRUCTIONS TO DETERMINE THE SPEED OF LINE PASSING THERE THROUGH AND COMMUNICATE TO THE SERVERS VIA THE WEB | 1004 |
| COMPUTER INSTRUCTIONS TO MEASURE ACCELERATION OF THE TOP DRIVE | 1006 |
| COMPUTER INSTRUCTIONS TO MEASURE LOCATION OF THE TOP DRIVE | 1008 |
| COMPUTER INSTRUCTIONS FOR DETERMINING A LOCATION OF THE TOP DRIVE BETWEEN THE CROWN AND THE SUBBASE | 1010 |

FIGURE 4

| DATA STORAGE | 610b |
|---|---|
| COMPUTER INSTRUCTIONS TO MANAGE SYNCHRONIZED FUNCTIONS OF THE DRILLING RIG, A VERTICAL PIPE HANDLER, AND A HORIZONTAL TO VERTICAL PIPE HANDLER | 620 |
| COMPUTER INSTRUCTIONS TO FORM AN EXECUTIVE DASHBOARD OF RIG FUNCTIONS, VERTICAL PIPE HANDLER FUNCTIONS AND HORIZONTAL TO VERTICAL PIPE HANDLER FUNCTIONS | 661 |
| COMPUTER INSTRUCTIONS TO LOWER THE TOP DRIVE TO AN END OF A TUBULAR DISPOSED IN THE WELLBORE | 702 |
| COMPUTER INSTRUCTIONS TO ENGAGE THE TOP DRIVE WITH THE TUBULAR IN THE WELLBORE AND ROTATING THE TUBULAR TO MAKE UP A CONNECTION WITH THE TOP DRIVE | 704 |
| COMPUTER INSTRUCTIONS TO WITHDRAW THE TUBULAR FROM THE WELLBORE | 706 |
| COMPUTER INSTRUCTIONS TO GRAB THE TUBULAR WITH A TOP AND A BOTTOM PIVOTING ARMS OF A VERTICAL PIPE HANDLER | 708 |
| COMPUTER INSTRUCTIONS TO RETRACT THE TOP AND BOTTOM PIVOTING ARMS OF THE VERTICAL PIPE HANDLER HOLDING THE TUBULAR AND ROTATE THE TOP AND BOTTOM ARMS WHILE LOWERING THE TOP AND BOTTOM ARMS | 710 |
| COMPUTER INSTRUCTIONS TO GRAB THE TUBULAR FROM THE VERTICAL PIPE HANDLER WITH THE HORIZONTAL TO VERTICAL PIPE HANDLER | 712 |
| COMPUTER INSTRUCTIONS TO LOWER THE HORIZONTAL TO VERTICAL PIPE HANDLER HOLDING THE TUBULAR AND PLACING PLACE THE TUBULAR IN A SET BACK OR A PIPE TUB | 714 |
| COMPUTER INSTRUCTIONS FOR SIMULTANEOUSLY REMOVING A DRILL STRING OF CONNECTED TUBULARS FROM A WELL BORE WHILE BREAKING UP TUBULARS FROM A DRILL STRING | 716 |
| COMPUTER INSTRUCTIONS FOR MEASURING THE LENGTH OF EACH TUBULAR THAT ARE REMOVED FROM THE WELLBORE | 2000 |
| COMPUTER INSTRUCTIONS FOR COUNTING EACH TUBULAR WITH THE RIG MOUNTED SENSOR AS THE TUBULARS ARE REMOVED FROM THE WELLBORE | 2002 |

MASTER CONTROL SYSTEM WITH REMOTE MONITORING FOR HANDLING TUBULARS

CROSS-REFERENCE TO RELATED APPLICATIONS

This application is a continuation of U.S. patent application Ser. No. 13/679,960, filed on Nov. 16, 2012, which claims the benefit of U.S. Provisional Application No. 61/587,438, filed on Jan. 17, 2012, entitled "MASTER CONTROL SYSTEM WITH REMOTE MONITORING FOR HANDLING TUBULARS," the content of which is incorporated herein by reference in its entirety.

FIELD

The present embodiments generally relate to a master control system with remote monitoring for handling tubulars.

BACKGROUND

A need exists for a master control system that allows one or more users to remotely monitor the installation, removal, or both of one or more tubulars.

A further need exists for a master control system that allows at least partial automation of rig operation to provide a safe work environment for rig personnel.

The present embodiments meet these needs.

BRIEF DESCRIPTION OF THE DRAWINGS

The detailed description will be better understood in conjunction with the accompanying drawings as follows:

FIG. 2 depicts a schematic of a portion of the master control system of FIG. 1 with a retracted top drive.

FIGS. 3A and 3B depict a detailed schematic of data storage according to one or more embodiments.

FIG. 4 depicts a detailed schematic of data storage according to one or more embodiments.

Figure 1:
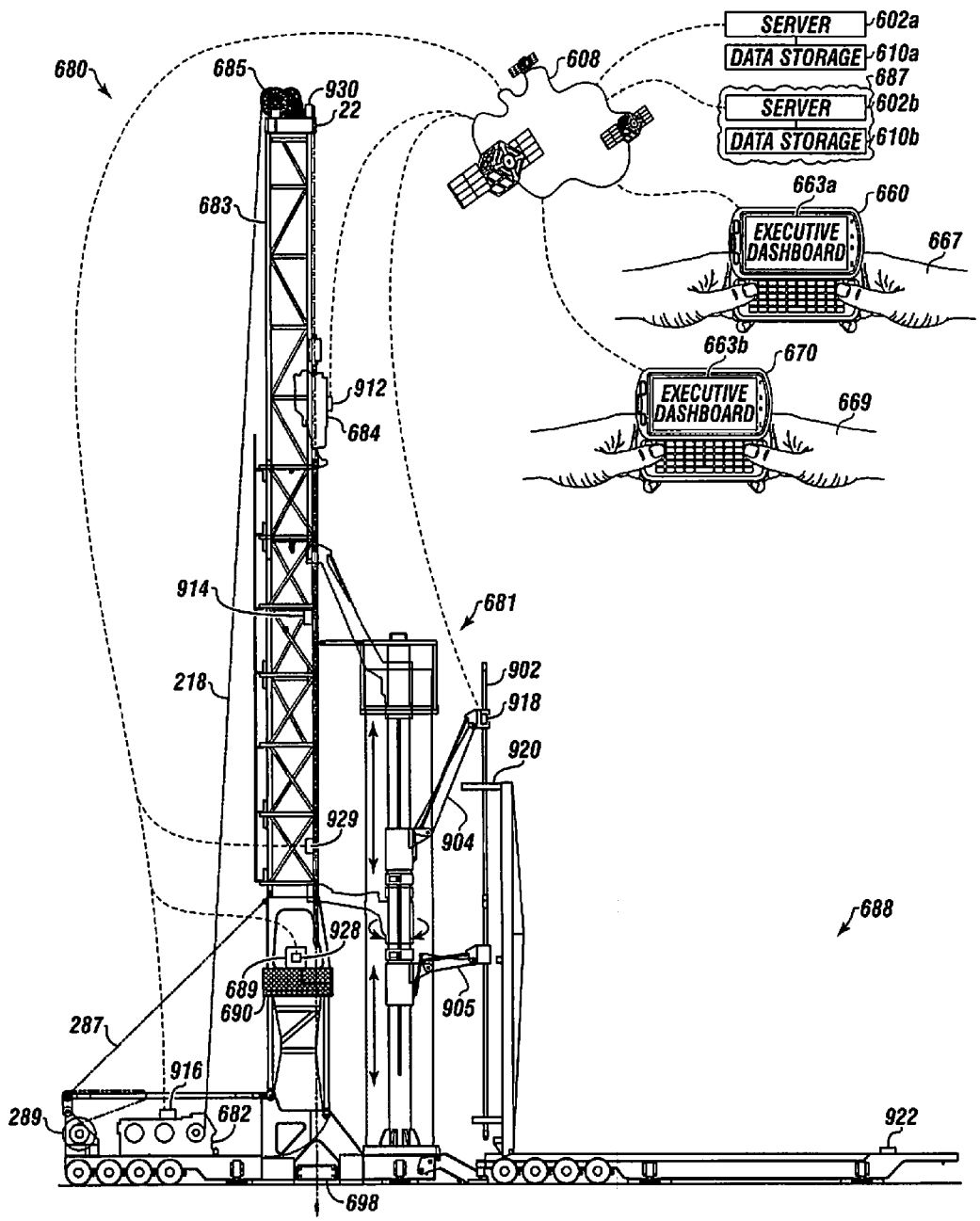
FIG. 1 depicts a schematic of a master control system configured to perform an operation on a tubular according to one or more embodiments.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments relate to a master control system with remote monitoring for handling one or more tubulars.

The master control system can include a server with a processor connected to a data storage, which can be on a network, connectable to a computing cloud, or both, for installing tubulars connectable into a drill string into a wellbore by a drilling rig.

The master control system can include a server with a processor connected to a data storage with a plurality of computer instructions for removing tubulars from a wellbore and breaking down a drill string.

The master control system can be used to allow remote monitoring during installation of one or more tubulars in a wellbore using a drilling rig. The remote monitoring can be 100 yards from the well bore or hundreds of miles from the well bore.

The invention provides increased safety and reduced accidents around the rig.

The invention allows a home office to act quickly when a rig may be experiencing difficulty in making up tubulars into a drill string or breaking down a drill string.

The master control system can include a server. The server can be a laptop, a PC, or another type of computing processor that communicates to data storage. The data storage and the processor that form the server can be in communication with a network and a data storage.

The server can be based in a computing cloud. The server can be in the home office of a driller, on a network.

The network can be a local area network, a wireless network, a satellite network, a similar network, or combinations thereof.

The server can be in communication with multiple client devices simultaneously, or with a single client device via the network. The client devices can be cell phones, laptops, PCs, desk top processors with data storage, tablets, and similar devices that can be wired or wirelessly connected to the network or the computing cloud and be configured to present an executive dashboard of rig functions, vertical pipe handler functions, and horizontal to vertical pipe handler functions, to a user of the client device.

The server can be in communication with a second client device via the network, a computing cloud, or both.

The second client device can be a device similar to the first client device, or different than the first client device. The second client device can be configured to present an executive dashboard of rig functions, vertical pipe handler functions, and horizontal to vertical pipe handler functions to a user of the client device.

The data storage can include computer instructions to manage synchronized functions of the rig's hoist system and a top drive, as well as the functions of a vertical pipe handler, and a horizontal to vertical pipe handler which are operationally connected together in series.

The computer instructions in the data storage can receive inputs from monitoring devices connected with components of the drilling rig, and can use the received inputs to determine a location of the top drive and vertical pipe handler, a position of the horizontal to vertical pipe handler, and a speed of the hoist system.

Sensors on the rig can also be used with computer instructions in the server to count the number of tubulars that are used on the drill string and to measure the length of each tubular being connected to or removed from a drill string.

For example, one or more sensors can be placed at one or more predetermined locations on a mast to detect if the top drive is proximate to the crown, to the tubular, or to the base of the mast.

One or more sensors on the rig can measure a rotational speed of the hoist system.

One or more sensors on the rig can determine the location of the top drive and computer instructions in the server can be used to continuously calculate the location of the top drive and the depth of the tubular in the well bore based on a sensed position and rotational speed of the hoist system.

In operation, the vertical pipe handler and the horizontal to vertical pipe handler can be actuated based on the sensed location of the top drive.

The data storage of the master control system can include computer instructions to determine when one or more tubulars are disposed on the horizontal to vertical pipe handler and to instruct the horizontal to vertical pipe handler to grab the one or more tubulars.

For example, the computer instructions in the data storage can receive inputs provided to the server by one or more sensors on the horizontal to vertical pipe handler, and when a signal from the sensors indicates that tubulars are disposed thereon, the computer instructions can instruct a processor of the server to actuate one or more cylinders on the horizontal to vertical pipe handler to grip the tubular.

The data storage can include computer instructions to raise the horizontal to vertical pipe handler to a vertical position from an initial horizontal position.

For example, these computer instructions can instruct the server to initiate movement of the horizontal to vertical pipe handler from a substantial horizontal position to a substantially vertical position once a sensor detects that a gripper has fully closed about the one or more tubulars on the horizontal to vertical pipe handler.

The data storage can include computer instructions to extend arms of the vertical pipe handler to grab a tubular from the horizontal to vertical pipe handler, and to rotate and lift the tubular for positioning at a well center. For example, these computer instructions can receive inputs on the location of the horizontal to vertical pipe handler, determine when the horizontal to vertical pipe handler is in an operative position, and instruct the processor to send one or more signals to the vertical pipe handler instructing the vertical pipe handler to extend top and bottom pivoting arms of the vertical pipe handler to grab the tubular from the horizontal to vertical pipe handler.

The data storage can include computer instructions to lower the top drive to an end of the tubular. For example, these computer instructions can compare the calculated or detected location of the top drive to a predetermined location, and instruct the processor to instruct a control of the hoist system to lower the top drive until the predetermined location is reached enabling the tubular to be connected to the top drive.

The data storage can include computer instructions to engage the top drive with the tubular making up the connection. For example, these computer instructions can instruct the top drive to secure to the tubular in a manner known to one skilled in the art.

The data storage can include computer instructions to rotate the tubular with the top drive and drive the tubular into the wellbore. For example, these computer instructions can instruct the processor to instruct the hoist system to lower the top drive when a signal is received indicating that the top drive has secured to the tubular.

The data storage can include computer instructions to retract the travelling block with the top drive, and to travel the top drive to a start position. The start position can be adjacent a crown when running tubulars into the wellbore. For example, these computer instructions can instruct the processor to instruct one or more arms connected to the traveling block to move the travelling block with the top drive into a channel formed in a mast when it is determined that the top drive and traveling block are aligned with a space.

The data storage can include computer instructions to extend arms of the vertical pipe handler to grab a subsequent tubular from the horizontal to vertical pipe handler, and rotate and lift the subsequent tubular for positioning at the well center.

The master control system can retract the traveling block into a recess in the mast and actuate the vertical pipe handler simultaneously.

The data storage can include computer instructions to lower the top drive to an end of the subsequent tubular. For example, these computer instructions can instruct the server to send a signal to the hoist system to lower the top drive upon receiving a signal indicating that the subsequent tubular member is in position to be engaged by the top drive.

The data storage can include computer instructions to engage the top drive with the subsequent tubular making up the connection.

The data storage can include computer instructions to rotate the subsequent tubular with the top drive and make up a connection with the tubular using a roughneck secured to a drilling floor. For example, these computer instructions can instruct the server to initiate rotation of the top drive when a signal is received indicating that the tubular member is engaged by hydraulic power tongs, and to move the subsequent tubular member towards the roughneck.

The data storage can include computer instructions to drive the tubulars into the well bore.

The data storage can include computer instructions to retract the travelling block with the top drive to the start position.

The data storage can include computer instructions to perform the foregoing operations on any number of tubulars.

The data storage can be configured to cause any number of tubulars to be ran downhole or removed from the wellbore.

The data storage can be configured to reset the horizontal to vertical pipe handler when the horizontal to vertical pipe handler is depleted of tubulars.

The data storage can include computer instructions to lower the horizontal to vertical pipe handler to a trailer frame. For example, these computer instructions can instruct the processor to lower the horizontal to vertical pipe handler to the trailer frame when an input is received that all tubulars have been removed from the horizontal to vertical pipe handler.

The master control system with remote monitoring can be configured to aid with the removal of tubulars from the well bore.

The data storage can be configured to include computer instructions to manage synchronized functions of the hoist system, the top drive, the vertical pipe handler, and the horizontal to vertical pipe handler.

The data storage can be configured to lower the top drive to an end of a tubular disposed in the wellbore.

The data storage can be configured to engage the top drive with the tubular making up a connection.

The data storage can be configured to retract the tubular from the wellbore using the top drive.

The data storage can be configured to determine when the hydraulic power tongs have engaged the tubular, and to operate the hydraulic power tongs to break out the tubular from subsequent tubulars located in the wellbore.

The data storage can be configured to engage the tubular with the vertical pipe handler.

The data storage can be configured to retract the vertical pipe handler to place the tubular in a setback The data storage can also include computer instructions to track how many tubulars are placed in the wellbore.

In one or more embodiments, the horizontal to vertical pipe handler can have two arms. Each arm of the horizontal to vertical pipe handler can be configured to hold independently raise the tubulars held therein to a vertical position.

Turning now to the Figures, FIG. 1 depicts a schematic of the master control system configured to perform an operation on a tubular according to one or more embodiments.

The master control system can include a server 602a which includes a processor and communicates to data storage 610a that is connected via a network 608.

Similarly, the master control system can include a cloud based server 602b which can include a processor and can communicate to cloud based data storage 610b that is in a computing cloud 687 and can communicate with the network 608.

The servers 602a and 602b can be configured to execute computer instruction in one or more data storages 610, and to communicate with devices via the network 608. The servers 602a and 602b can be a PENTIUM™ processor or similar device.

The one or more data storages 610a and 610b can be connected to, integrated with, or otherwise in communication with the servers 602a and 602b.

In embodiments, a cloud based server, a non-cloud based server, or both can be used simultaneously.

Similarly, in embodiments, a cloud based data storage, a non-cloud base data storage, or both can be used simultaneously.

A first client device 660 and a second client device 670 can be in communication with the network 608, the computing cloud 687 or both simultaneously.

The first client device 660 is configured for receiving and presenting an executive dashboard 663a which displays not only rig functions to a first user but also vertical pipe handler operational information and horizontal to vertical pipe handler operational information to the first user 667.

The second client device 670 is configured for receiving and presenting the executive dashboard 663b which is identical to the executive dashboard 663a of the first client device. Like the executive dashboard 663a, executive dashboard 663b displays not only rig functions to a second user but also vertical pipe handler operational information and horizontal to vertical pipe handler operational information to the second user 669.

The master control system can communicate with a drilling rig 680.

The drilling rig 680 can be sequentially connected and operationally connected to a vertical pipe handler 681, and a horizontal to vertical pipe handler 688.

The master controller operates a hoist system 682 of the rig, which is shown sitting on a subbase trailer, as this is a portable rig.

The hoist system includes a drawworks and a drill line 218 that connects to a top drive 684. The master control for this embodied portable rig can be used to control a winch 289 that runs a hoist line 287 for raising or lowering the mast 683 of the rig.

In this Figure, the master controller can also be used to operate hydraulic power tongs 689.

The drill line 218 passes from the drawworks to the crown 22 and then to the top drive.

The hoist system 682 can have a rotational speed monitoring device 916 that communicates to the master controller.

The rotational speed monitoring device 916 can be any device capable of determining the rotational speed of the hoist system 682 and transmitting the rotations per minute to the server in the computing cloud or on the network outside of the computing cloud.

The vertical pipe handler 681 can have one or more vertical pipe handler monitoring devices 918 that can monitor the presence of each tubular 902 and the device and determine pressure applied to each tubular connected, to the vertical pipe handler. The vertical pipe handler monitoring device 918 then transmits the signal to the server.

The vertical pipe handler monitoring devices 918 can be configured to determine: (i) if the arms of the vertical pipe handler 681 are actuated, (ii) a position of the arms, or combinations thereof, and transmit the information to the server in the computing cloud or on the network outside of the computing cloud.

The top drive 684 can have one or more top drive monitoring devices 912.

The top drive monitoring devices 912 can be accelerometers, radio frequency identification (RFID) tags, or any other device capable of measuring the acceleration of the top drive 684 and/or aiding in the determination thereof by sending a signal or interacting with another monitoring device to cause a signal to be sent. In embodiments, the top drive monitoring device is a device capable of measuring the location of the top drive.

For example, the top drive 684 can have a chip or device configured to interact with one or more mast monitoring devices 914 to cause a signal to be sent to the server 602a or 602b or both between a crown and a base to detect where a top drive is located.

The hydraulic power tongs 689 can be power tongs secured to a drill floor 690 of the drilling rig 680. The hydraulic power tongs 689 can have one or more hydraulic power tong monitoring devices 928 configured to determine if the hydraulic power tongs 689 are in a closed position or opened position, determine forces applied to the hydraulic power tongs 689, or combinations thereof. The hydraulic power tong monitoring devices can communicate with the servers in the computing cloud or connected via the network to enable continuous monitoring of the apparatus.

The horizontal to vertical pipe handler 688 can have one or more horizontal to vertical pipe handler monitoring devices 920 and 922 configured to detect the location of the horizontal to vertical pipe handler 688, speed of the horizontal to vertical pipe handler 688, force applied to the horizontal to vertical pipe handler 688, the presence of a tubular 902, how many tubulars are disposed on the horizontal to vertical pipe handler 688, the like, or combinations thereof. The horizontal to vertical pipe handler monitoring devices 920 and 922 can communicate to the servers in the computing cloud or connected via the network.

The crown 22 can have a top crown 685 can have one or more top crown monitoring devices 930 to determine the speed of line passing therethrough and communicate to the servers in the computing cloud or connected via the network.

Each of the monitoring devices, including the horizontal to vertical pipe handler monitoring devices 920 and 922, top crown monitoring devices 930, rotational speed monitoring device 916, hydraulic power tong monitoring devices 928, mast monitoring devices 914, top drive monitoring devices 912, and vertical pipe handler monitoring devices 918, can communicate with a server 602 through any form of telemetry, such as through the network 608 or the computing cloud 687 using individual protocols of each sensor. Illustrative telemetry can include wired, wireless, acoustic, frequency, or combinations thereof.

The drilling rig 680 can be operatively aligned with a wellbore 698.

Also shown is a rig mounted sensor 929 that can be: used with computer instructions in the data storage 610 for counting each tubular and/or measuring the length of each tubular that enters the wellbore 698.

FIG. 2 depicts the vertical pipe handler 681 with a tubular 902 adjacent a drilling rig 680.

The vertical pipe handler is shown with the top pivoting arm 904 holding the tubular 902 below a top drive 684 over the well center, and the bottom pivoting arm 905 also grasping the tubular 902. In this view the vertical pipe handler has raised the tubular from its position when grasped from the horizontal to vertical pipe handler 688 above the base of the rig.

FIG. 2 also shows a vertical pipe handler rotation and vertical motion monitor 932. The vertical pipe handler rotation and vertical motion monitor 932 transmits to the master control system a signal indicating a degree at which the vertical pipe handler is positioned and a height at which either the top pivoting arm 904, the bottom pivoting arm 905, or both, are located from a base of the vertical pipe handler.

The top pivoting arm 904 can have a first arm monitor 934, and the bottom pivoting arm 905 can have a second arm monitor 936, which can communicate with the master control system to determine an angle of extension of each pivoting arm on a vertical pipe handler and transmit the angle of extension to the server.

Also shown in FIG. 2 are sensors that transmit signals on the location of the tubular on the horizontal to vertical pipe handler 688.

The sensors for the horizontal to vertical pipe handler 688 include a horizontal to vertical pipe handler tubular monitoring device 921 transmitting information that a tubular is on the horizontal to vertical pipe handler 688 to the server.

The sensors for the horizontal to vertical pipe handler 688 include a horizontal to vertical pipe handler tubular rolling monitoring device 923 transmitting information that a tubular is rolling or stopped rolling on the horizontal to vertical pipe handler to the server.

The sensors for the horizontal to vertical pipe handler include a horizontal to vertical pipe handler grip monitoring device 925 transmitting information that a tubular is gripped securely by the horizontal to vertical pipe handler.

The mast 683 is also shown in this Figure.

Figure 3B:
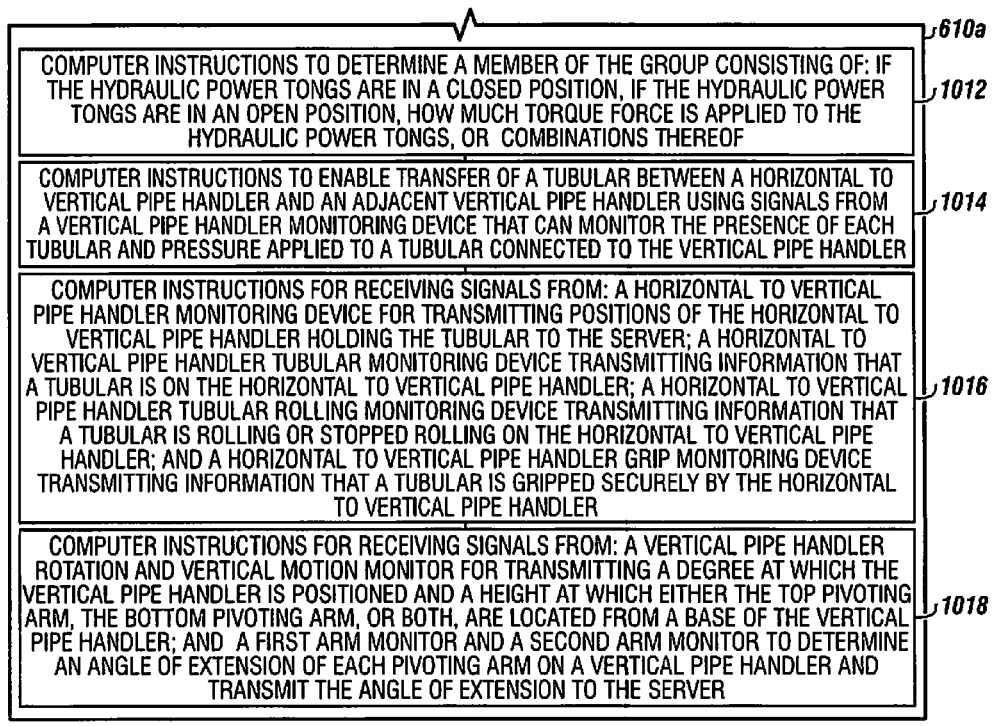

FIGS. 3A and 3B depict a detailed schematic of data storage 610a according to one or more embodiments.

The data storage 610a can include computer instructions 620 to manage synchronized functions of the drilling rig a vertical pipe handler, and a horizontal to vertical pipe handler.

The data storage 610a can include computer instructions 621 to determine when a tubular is on a horizontal to vertical pipe handler.

The data storage 610a can include computer instructions 624 to raise the tubular from a horizontal position to a vertical position using the horizontal to vertical pipe handler.

The data storage 610a can include computer instructions 626 to extend top and bottom pivoting arms of the vertical pipe handler.

The data storage 610a can include computer instructions 627 to grab the raised tubular from the horizontal to vertical pipe handler using the top and bottom pivoting arms.

The data storage 610a can include computer instructions 629 to rotate the extended pivoting arms holding the tubular to position the tubular over the well center.

The data storage 610a can include computer instructions 629 to lift the tubular to a position proximate to the top drive for connection with the top drive.

The data storage 610a can include computer instructions 630 to lower the top drive down a mast of the drilling rig for connection to an end of the tubular.

The data storage 610a can include computer instructions 631 to connect the top drive to the tubular.

The data storage 610a can include computer instructions 632 to rotate the tubular using the top drive to insert the tubular into the wellbore while lowering the top drive towards the well bore.

The data storage 610a can include computer instructions 634 to disengage the tubular from the top drive once the tubular reaches a preset depth.

The data storage 610a can include computer instructions 646 to retract the top drive away from the wellbore.

The data storage 610a can include computer instructions 661 to form an executive dashboard of rig functions, vertical pipe handler functions and horizontal to vertical pipe handler functions.

The data storage 610a can include computer instructions 638 for simultaneously drilling with the drilling rig while connecting tubulars.

The data storage 610a can include computer instructions 1000 for measuring the length of each tubular that enters the well bore.

The data storage 610a can include computer instructions 1002 for counting each tubular with the rig mounted sensor as the top drive inserts the tubulars into the well bore.

The data storage 610a can include computer instructions 1004 to determine the speed of line passing there through and communicate to the servers via the web.

The data storage 610a can include computer instructions 1006 to measure acceleration of the top drive.

The data storage 610a can include computer instructions 1008 to measure location of the top drive.

The data storage 610a can include computer instructions 1010 for determining a location of the top drive between the crown and the subbase.

The data storage 610a can include computer instructions 1012 to determine a member of the group consisting of: if the hydraulic power tongs are in a closed position, if the hydraulic power tongs are in an open position, how much torque force is applied to the hydraulic power tongs, or combinations thereof.

The data storage 610a can include computer instructions 1014 to enable transfer of a tubular between a horizontal to vertical pipe handler and an adjacent vertical pipe handler using signals from a vertical pipe handler monitoring device that can monitor the presence of each tubular and pressure applied to a tubular connected to the vertical pipe handler.

The data storage 610a can include computer instructions 1016 for receiving signals from: a horizontal to vertical pipe handler monitoring device for transmitting positions of the horizontal to vertical pipe handler holding the tubular to the server; a horizontal to vertical pipe handler tubular monitoring device transmitting information that a tubular is on the horizontal to vertical pipe handler; a horizontal to vertical pipe handler tubular rolling monitoring device transmitting information that a tubular is rolling or stopped rolling on the horizontal to vertical pipe handler; and a horizontal to vertical pipe handler grip monitoring device transmitting information that a tubular is gripped securely by the horizontal to vertical pipe handler.

The data storage 610a can include computer instructions 1018 for receiving signals from: a vertical pipe handler rotation and vertical motion monitor for transmitting a degree at which the vertical pipe handler is positioned and a height at which either the top pivoting arm the bottom pivoting arm, or both; are located from a base of the vertical pipe handler; and a first arm monitor and a second arm monitor to determine an angle of extension of each pivoting arm on a vertical pipe handler and transmit the angle of extension to the server.

FIG. 4 is a detailed schematic of data storage 610b according to one or more embodiments.

The data storage 610b can include computer instructions 620 to manage synchronized functions of the drilling rig, a vertical pipe handler and a horizontal to vertical pipe handler.

The data storage 610b can include computer instructions 661 to form an executive dashboard of rig functions, vertical pipe handler functions and horizontal to vertical pipe handler functions.

The data storage 610b can include computer instructions 702 to lower the top drive to an end of a tubular disposed in the well bore.

The data storage 610b can include computer instructions 704 to engage the top drive with the tubular in the wellbore and rotating the tubular to make up a connection with the top drive.

The data storage 610b can include computer instructions 706 to withdraw the tubular from the wellbore.

The data storage 610b can include computer instructions 708 to grab the tubular with a top and a bottom pivoting arms of a vertical pipe handler.

The data storage 610b can include computer instructions 710 to retract the top and bottom pivoting arms of the vertical pipe handler holding the tubular and rotate the top and bottom arms while lowering the top and bottom arms.

The data storage 610b can include computer instructions 712 to grab the tubular from the vertical pipe handler with the horizontal to vertical pipe handler.

The data storage 610b can include computer instructions 714 to lower the horizontal to vertical pipe handler holding the tubular and placing place the tubular in a set back or a pipe tub.

The data storage 610b can include computer instructions 716 for simultaneously removing a drill string of connected tubulars from a well bore while breaking up tubulars from a drill string.

The data storage 610b can include computer instructions 2000 for measuring the length of each tubular that are removed from the wellbore, and computer instructions 2002 for counting each tubular with the rig mounted sensor as the tubulars are removed from the wellbore.

Figure 5:
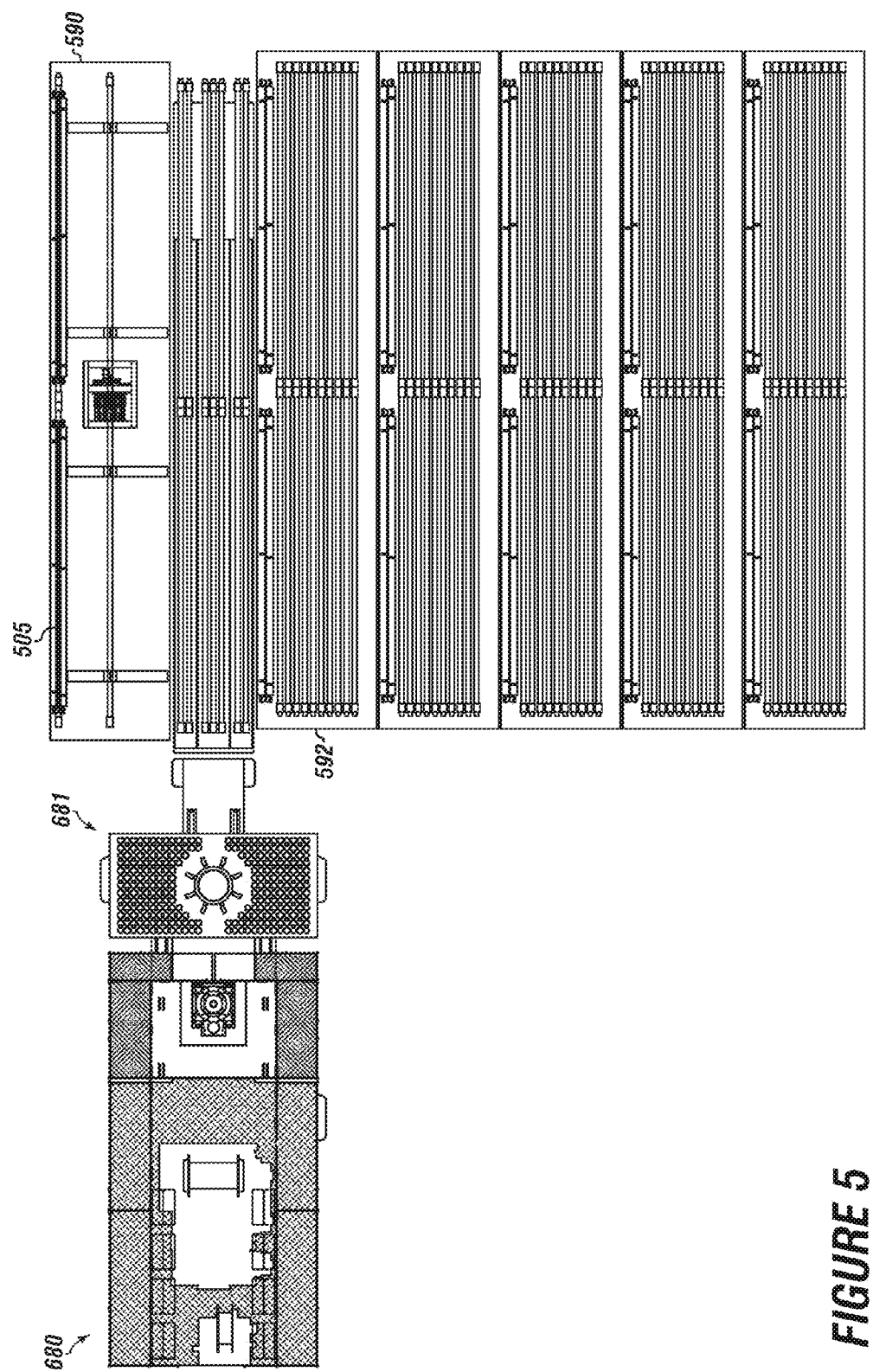
FIG. 5 is a top view of an embodiment of the drilling rig, vertical pipe handler, and horizontal to vertical pipe handler that can be controlled by the master controller.

FIG. 5 is a top view of an embodiment of the rig and vertical pipe handler and horizontal to vertical pipe handler that can be controlled by the master controller.

In this view can be seen the bucking machine 590 with a tubular 505 and the pipe tub 592 connected to the vertical pipe handler 681 connected to a drilling rig 680.

While these embodiments have been described with emphasis on the embodiments, it should be understood that within the scope of the appended claims, the embodiments might be practiced other than as specifically described herein.

What is claimed is:

1. A system comprising:
   a data storage; and
   a processing device communicatively coupled to the data storage, the processing device to:
   receive a communication associated with a component of a remote drilling rig, wherein the component of the remote drilling rig comprises a vertical tubular handler and the communication associated with the component of the remote drilling rig comprises an indication that a tubular is disposed on the vertical tubular handler;
   determine a position of the component of the remote drilling rig based on the received communication;
   provide an executive dashboard that includes at least one drilling rig function associated with the component of the remote drilling rig;
   initiate the remote drilling rig to perform the at least one drilling rig function associated with the component of the remote drilling rig, wherein the at least one drilling rig function comprises using the remote drilling rig to grab the tubular by the vertical tubular handler or raise the tubular to a vertical position from an initial horizontal position; and
   responsive to the remote drilling rig being initiated to grab the tubular, send a signal to the vertical tubular handler to extend at least one pivoting arm to grab the tubular from the initial horizontal position.

2. The system of claim 1, wherein the component of the remote drilling rig comprises a hoist system, wherein the communication associated with the component of the remote drilling rig comprises a sensed position and rotational speed of the hoist system, wherein the processing device is to determine a depth of a tubular in a well bore based on the sensed position and rotational speed of the hoist system.

3. The system of claim 2, wherein the at least one drilling rig function comprises actuating the vertical tubular handler based on the determined depth of the tubular in the well bore.

4. The system of claim 2, wherein the component of the remote drilling rig comprises a top drive, wherein the processing device is to determine a location of the top drive based on the sensed position and rotational speed of the hoist system.

5. The system of claim 4, wherein the at least one drilling rig function comprises actuating the vertical tubular handler based on the location of the top drive.

6. The system of claim 1, wherein the communication associated with the component of the remote drilling rig comprises at least one of: installing, moving or removing a tubular.

7. The system of claim 1, wherein when determining the position of the component, the processing device is to identify a sensed location of a top drive based on the communication, wherein when initiating the remote drilling rig to perform the at least one drilling rig function, the processing device is to actuate the vertical tubular handler based on the sensed location of the top drive.

8. The system of claim 1, wherein the executive dashboard further includes tubular handler operation information for at least one of a vertical tubular handler or a horizontal tubular handler.

9. The system of claim 1, wherein when initiating the remote drilling rig to perform the at least one drilling rig function associated with the component of the remote drilling rig, the processing device is to:
   receive input pertaining to at least one drilling rig function via the executive dashboard; and
   transmit an instruction to the drilling rig to perform the at least one drilling rig function that pertains to the received input.

10. A system comprising:
a server communicatively coupled to a remote drilling rig, the server comprising:
  a data storage; and
  a processing device communicatively coupled to the data storage, the processing device to:
    receive a communication associated with a component of the drilling rig, wherein the component of the remote drilling rig comprises a vertical tubular handler and the communication associated with the component of the remote drilling rig comprises an indication that a tubular is disposed on the vertical tubular handler;
    determine a position of the component of the remote drilling rig based on the received communication;
    provide an executive dashboard to a client device that includes at least one drilling rig function associated with the component of the remote drilling rig;
    receiving an instruction from the client device to perform the at least one drilling rig function;
    initiate the remote drilling rig to perform the at least one drilling rig function associated with the component of the remote drilling rig, wherein the at least one drilling rig function comprises using the remote drilling rig to grab the tubular by the vertical tubular handler or raise the tubular to a vertical position from an initial horizontal position; and
    responsive to the remote drilling rig being initiated to grab the tubular, send a signal to the vertical tubular handler to extend at least one pivoting arm to grab the tubular from the initial horizontal position.

11. The system of claim 10, wherein the component of the remote drilling rig comprises a hoist system, wherein the communication associated with the component of the remote drilling rig comprises a sensed position and rotational speed of the hoist system, wherein the processing device is to determine a depth of a tubular in a well bore based on the sensed position and rotational speed of the hoist system.

12. The system of claim 10, wherein the communication associated with the component of the remote drilling rig comprises at least one of: installing, moving or removing a tubular.

13. A non-transitory computer readable storage medium comprising instructions that, when executed by a processing device, cause the processing device to perform operations comprising:
  receiving a communication associated with a component of a remote drilling rig, wherein the component of the remote drilling rig comprises a vertical tubular handler and the communication associated with the component of the remote drilling rig comprising an indication that a tubular is disposed on the vertical tubular handler;
  determining, by the processing device, a position of the component of the remote drilling rig based on the received communication;
  providing an executive dashboard that includes at least one drilling rig function associated with the component of the remote drilling rig;
  initiating, by the processing device, the remote drilling rig to perform the at least one drilling rig function associated with the component of the remote drilling rig, wherein the at least one drilling rig function comprises grabbing the tubular by the vertical tubular handler or raising the tubular to a vertical position from an initial horizontal position; and
  responsive to the remote drilling rig being initiated to grab the tubular, sending a signal to the vertical tubular handler to extend at least one pivoting arm to grab the tubular from the initial horizontal position.

14. The non-transitory computer readable storage medium of claim 13, wherein the component of the remote drilling rig comprises a hoist system, wherein the communication associated with the component of the remote drilling rig comprises a sensed position and rotational speed of the hoist system, wherein the processing device is to determine a depth of a tubular in a well bore based on the sensed position and rotational speed of the hoist system.

15. The non-transitory computer readable storage medium of claim 13, wherein the executive dashboard further includes tubular handler operation information for at least one of a vertical tubular handler or a horizontal tubular handler.

* * * * *